United States Patent [19]

Haskins

[11] 4,335,269
[45] Jun. 15, 1982

[54] ISOLATOR DEVICE AND WIRE DISTRIBUTING SYSTEM UTILIZING THE SAME

[75] Inventor: Paul L. Haskins, Aliquippa, Pa.

[73] Assignee: H. H. Robertson Company, Pittsburgh, Pa.

[21] Appl. No.: 188,852

[22] Filed: Sep. 19, 1980

[51] Int. Cl.³ ............................................. H02G 3/28
[52] U.S. Cl. ......................................... 174/48; 174/51
[58] Field of Search ....................... 174/48, 49, 51, 95, 174/96, 97, 98; 52/220, 221

[56] References Cited

U.S. PATENT DOCUMENTS

| | | | |
|---|---|---|---|
| 739,282 | 9/1903 | Bohn | 174/48 |
| 2,749,655 | 6/1956 | Ashton | 312/245 X |
| 3,606,893 | 9/1971 | Verberg | 220/4 R X |
| 3,899,632 | 8/1975 | Alley | 174/DIG. 2 |
| 3,932,696 | 1/1976 | Fork et al. | 174/48 |
| 4,178,469 | 12/1979 | Fork | 174/48 |

Primary Examiner—Arthur T. Grimley
Assistant Examiner—D. A. Tone
Attorney, Agent, or Firm—George E. Manias

[57] ABSTRACT

An insert for an underfloor electrical wiring distribution system of the type incorporating a distribution unit presenting alternating cells and troughs and capping means enclosing one of the troughs to provide an intermediate cell having at least one trough portion accessible from the upper surface of the floor. The insert includes an isolator device having a generally U-shaped configuration including spaced sidewalls and a connecting front wall. The isolator device is installed in the trough portion to provide an isolated chamber. Connecting means in the form of cooperating tabs and apertures positively secures the device to the distribution unit. A partition plate may be installed with a lower portion thereof retained by the device and with an upper portion thereof extending above the isolator device.

14 Claims, 6 Drawing Figures

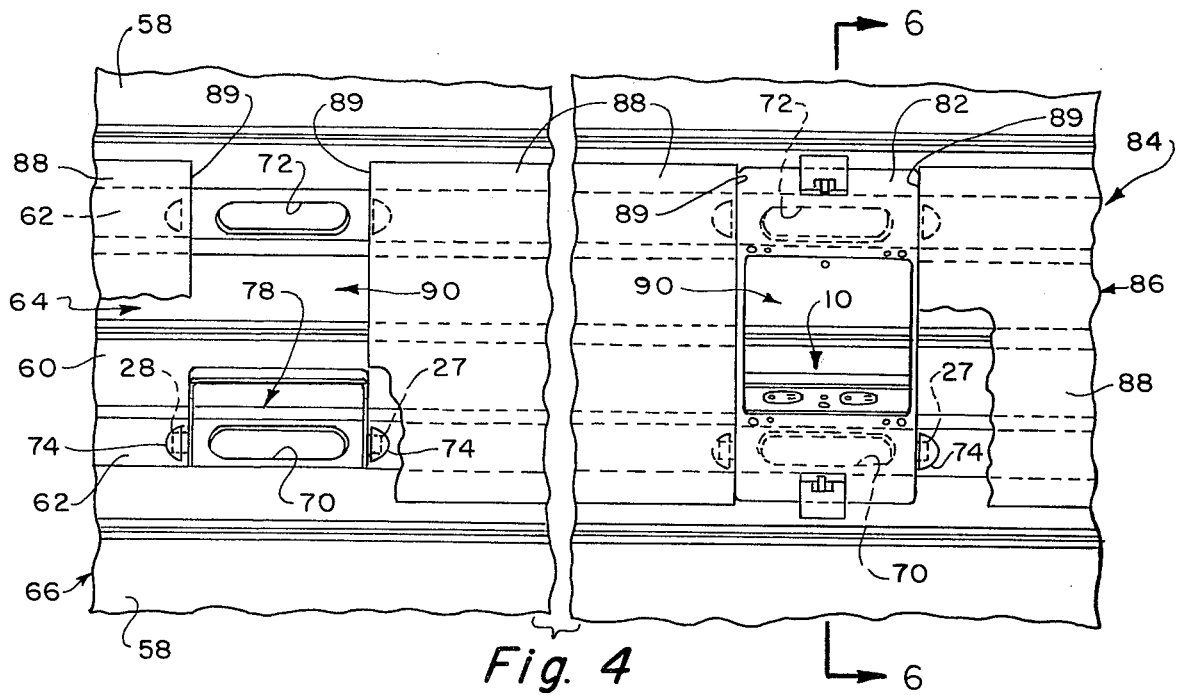
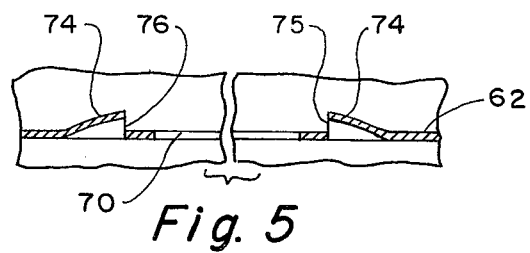
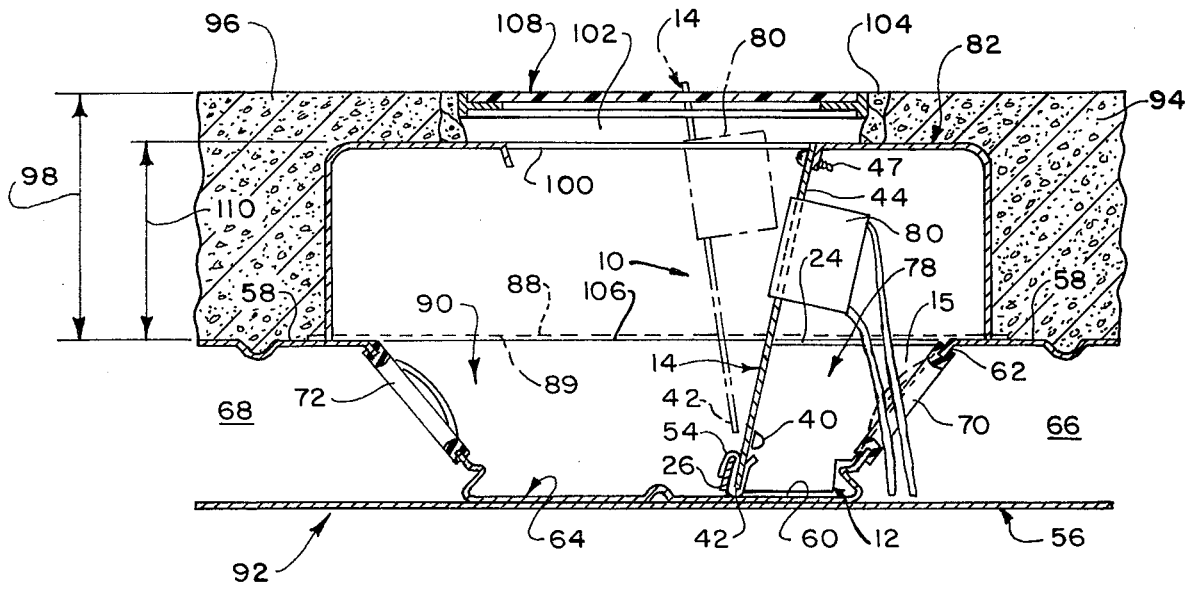

ISOLATOR DEVICE AND WIRE DISTRIBUTING SYSTEM UTILIZING THE SAME

BACKGROUND OF THE INVENTION

1. Field of the Invention

This invention relates to electrical wiring conduit devices, and more particularly to inserts for use in floors and the like for segregating high and low voltage wiring egressing from adjacent raceways.

2. Description of the Prior Art

Wire distribution systems which utilize a cellular metal unit having spaced raceways or cells, and an intermediate trough which is enclosed by capping means to provide a third raceway or cell are known. See for example U.S. Pat. Nos. 3,592,956 (FORK); 4,178,469 (FORK). The capping means may comprise plural cover strips and at least one housing (FORK '956) or a protective cover (FORK '469). Each housing or protective cover comprises an activation site at which access to plural electrical services may be gained at a single location in the finished floor structure. Such cellular metal units are used in floor structures wherein the concrete cover above the raceways or cells may vary from one inch (2.54 cm) to 3¼ inches (8.26 cm) or more.

Where the concrete cover thickness is about one inch (2.54 cm), only the FORK '469 protective cover is provided. During activation, the cover is removed to gain access to the raceway and to the third cell. The U-shaped members provide separate vertically presented chambers. Each U-shaped member isolates the wiring egressing from the adjacent raceway from all other wiring.

Where the concrete cover thickness exceeds two inches (5.08 cm), an inverted cup-shaped housing, such as that shown at 42 in U.S. Pat. No. 3,932,696 (FORK et al), is interposed between the protective cover and the metal cellular unit of FORK '469. To accommodate anticipated concrete cover thicknesses of 2 inches (5.04 cm), 2½ inches (6.35 cm) and 3 inches (7.62 cm) or 3¼ inches (8.26 cm), housings of preselected depths of 1½ inch (3.81 cm), 1⅝ inches (4.13 cm) and 2⅜ inches (6.03 cm) are used.

During activation, complete segregation of the high and low voltage wiring is accomplished by installing a distinct partition extension which extends from one of the U-shaped members upwardly into the interior of the housing. The distinct partition plate normally is secured to the top of the U-shaped member and to the top of the housing.

In accordance with present practices different size partition extensions are required to accommodate the various concrete cover thicknesses. Different size partition extensions may be maintained in stock along with partition plates used in other types of inserts. Stock maintenance is, of course, a costly procedure from a materials standpoint. Alternatively, special orders may be sent to a manufacturer for the partition extension—such special orders serving to increase the overall materials cost for each insert. In addition, the double fastening (top and bottom) required to install the partition extension requires added labor time and therefore increases the cost of installing each insert.

SUMMARY OF THE INVENTION

The principal object of this invention is to provide an insert which is positively connected to the metal cellular unit without using separate fastening elements.

Another object of this invention is to provide an insert which accepts existing partition plates thereby avoiding the need to fabricate and stock specially sized partition extensions.

Still another object of this invention is to provide an insert having integrally formed retaining means which retains the lower end of the partition plate against movement during insertion and removal of electrical plugs.

The present invention provides an insert for use in an electrical wiring distributing system. The insert includes an isolator device having a generally U-shaped configuration including spaced-apart sidewalls, and a connecting front wall. Tabs are provided which extend in opposite directions from and generally normal to the sidewalls. The tabs are positioned to be inserted into aligned apertures presented by a metal cellular unit and thereby positively connect the isolator device to the metal cellular unit.

The insert also includes abutments formed on the sidewalls spaced from the front wall; and a partition plate having a portion captively retained between the front wall and the abutments, and a portion extending upwardly beyond the upper edges of the sidewalls. In accordance with this invention, the front wall may comprise a narrow sprip having a height which is a minor fraction of the height of the sidewalls. The narrow strip may be formed adjacent to the lower edges of the sidewalls and is vertically offset relative to the abutments. Thus arranged, the insert may accept any one of the existing partition plates normally used in other insert devices to accommodate the various concrete cover thicknesses.

Means, such as a friction clip, may be provided to connect the partition plate to the isolator device in electrically grounded relation therewith. That is, the friction clip provides for electrical grounding continuity between an electrical receptacle carried by the partition plate and the metal cellular unit.

The present insert is particularly useful in a distribution unit which is disposed in a floor structure to provide parallel raceways. The distribution unit includes a metal cellular unit presenting alternating crests and valleys connected by webs, and presenting a lengthwise trough intermediate of the raceways which is defined by a valley and the confronting webs connected thereto. Access to the adjacent raceways is provided by opposed access openings in the confronting webs. When installed, the isolator device cooperates with the valley and one web to provide a generally vertical chamber including one of the access openings. The oppositely extending tabs are disposed adjacent to the one web. Embossments, formed in the web at opposite ends of the access opening, are slit and provide aligned apertures. Each of the tabs extends into one of the apertures thereby positively connecting the isolator device to the metal cellular unit. The partition plate which has a portion captively retained between the front wall and the abutments extends upwardly beyond the sidewalls of the isolator device and upwardly beyond the one web for presentation in a cavity formed, for example by a pre-set enclosure, in a subsequently applied layer of concrete. The partition plate is, of course, selected from existing partition plates to match the distance between the top of the cavity and the valley of the metal cellular unit.

The above-described distribution unit may be used in an electrical wiring distributing floor structure including capping means which enclose the trough to provide an intermediate raceway and which are spaced-apart to allow access to a trough portion. A layer of concrete is provided over the distribution unit. A passageway formed in the concrete cover has an upper end communicating with a space above the concrete and a lower end communicating through the spaced capping means with the trough portion. Cover means supported in covering relation with the upper end of the passageway is provided for gaining access to the interior of the passageway to allow egress of multi-service electrical conductors.

BRIEF DESCRIPTION OF THE DRAWINGS

FIG. 4 is a broken fragmentary plan view of the metal cellular unit of FIG. 3 further illustrating the present insert;

FIG. 5 is a fragmentary cross-sectional view taken along the line 5—5 of FIG. 3; and FIG. 6 is a cross-sectional view of a floor structure, as seen from the line 6—6 of FIG. 4.

DESCRIPTION OF THE PREFERRED EMBODIMENT(S)

The insert 10 (FIG. 1) of this invention comprises an isolator device 12 and a partition plate 14 for use therewith.

Figure 1:
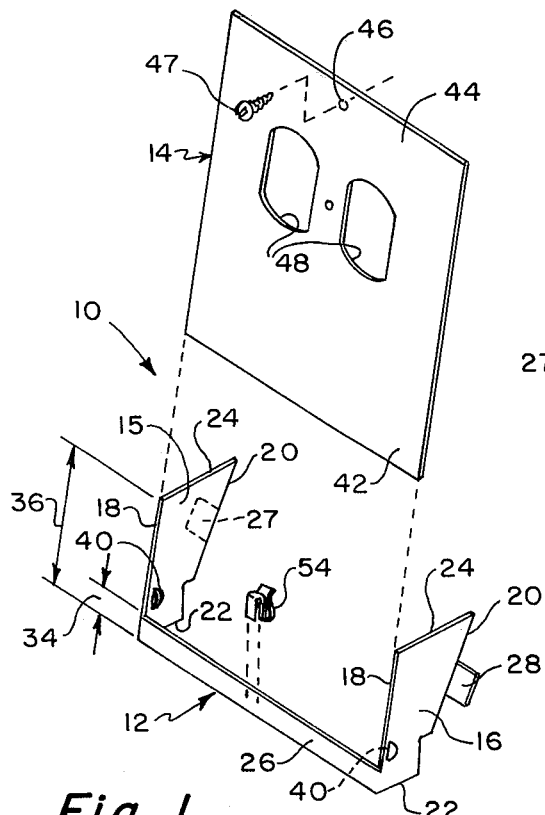
FIG. 1 is an exploded isometric view illustrating components of the present insert.

The isolator device 12 may be cut from a flat metal sheet illustrated in FIG. 1 having a thickness in the range of from 0.035 inches (0.089 cm) to 0.059 inches (0.150 cm). The isolator device 12 is thereafter bent into the generally U-shaped configuration illustrated in FIG. 1. The isolator device 12 includes opposite sidewalls 15, 16 having corresponding forward edges 18, rear edges 20, lower edges 22, and upper edges 24; and a connecting front wall 26 extending between the forward edges 18. Tabs 27, 28 are provided, one on each of the rear edges 20. The sidewalls 15, 16 are subsequently bent about the bend lines 30 to conform to the generally U-shaped configuration illustrated in FIG. 1. The tabs 27, 28 are subsequently bent about the bend lines 32 such that the tabs 27, 28 extend in opposite directions from and generally normal to the sidewalls 15, 16 as illustrated in FIG. 1.

Figure 2:
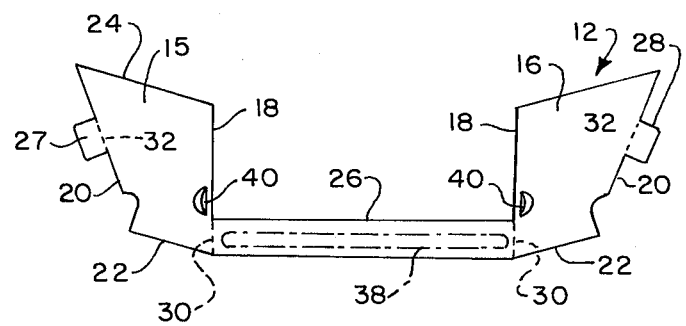
FIG. 2 is an elevation view of the isolator device cut from a flat metal sheet and prior to bending.

The front wall 26 may comprise a relatively narrow strip having a height indicated at 34 in FIG. 1 which is a minor fraction of the height indicated at 36 of the sidewall 15, 16. While the front wall 26 may be formed at any location along the forward edges 18, the front wall 26 preferably is provided adjacent to the lower edges 22. If desired, a stiffening rib indicated by the dash-dot line 38 in FIG. 2 may be formed in and longitudinally of the front wall 26. The stiffening rib 38, when provided, resists undue bending of the narrow front wall 26 during insertion and removal of electrical plugs.

The isolator device 12 also is provided with abutments 40, one in each of the sidewalls 15, 16. The abutments 40 project from the inner surface of the sidewalls 15, 16 and cooperate with the front wall 26 to captively retain a portion of the partition plate 14, as will be described.

Figure 3:
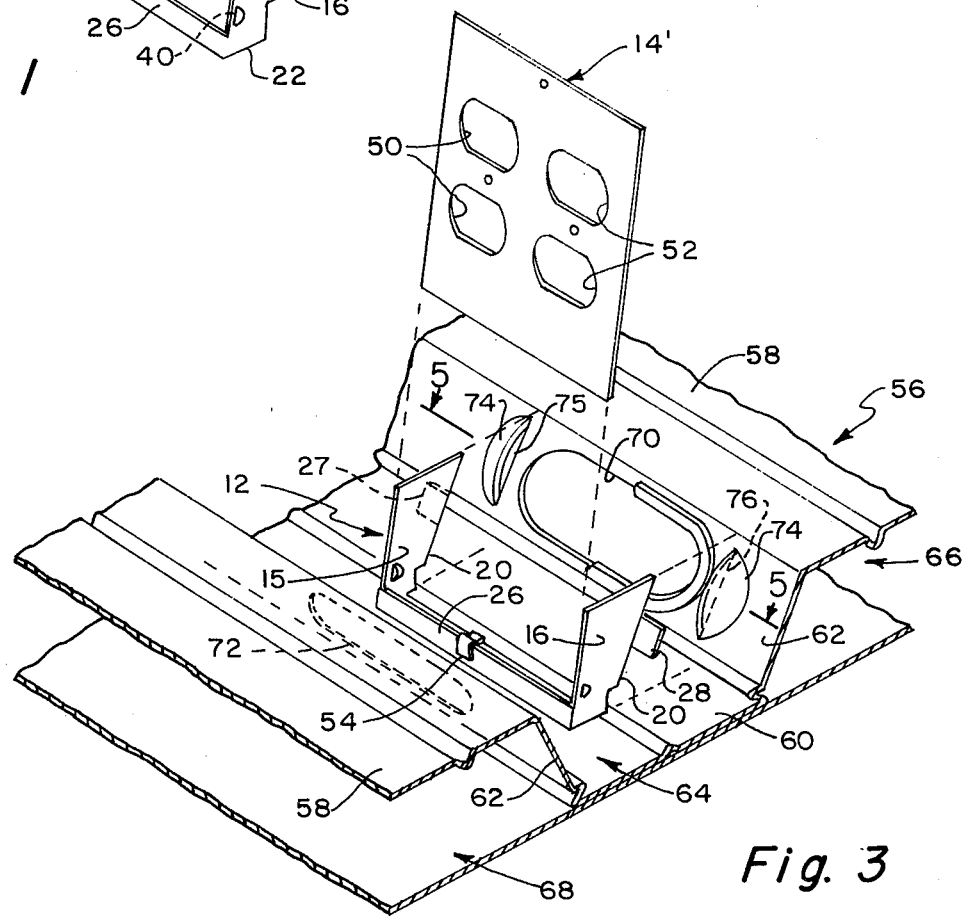
FIG. 3 is a fragmentary isometric view illustrating installation of the present insert in the valley of a metal cellular unit.

The partition plate 14 (FIG. 1) presents a lower portion 42 and an upper portion 44. An aperture 46 is provided adjacent the upper end of the partition 14 for receiving a fastener 47. The partition plate 14 may be provided with a pair of openings 48 which are horizontally disposed to receive a single duplex receptacle. Alternatively, as shown in FIG. 3, the partition plate 14 may be provided with a pair of vertically disposed openings 50 and a pair of vertically disposed openings 52 arranged to receive two duplex receptacles. A suitable friction clip 54 may be provided for securing the partition plate to the isolator device in electrically grounded relation.

The insert 10 is particularly adapted for use in a distribution unit 56 (FIG. 3) of the type presenting alternating crests 58 and valleys 60 connected by webs 62. The unit 56 presents a lengthwise trough 64 intermediate of adjacent cells or raceways 66, 68. The lengthwise trough 64 is defined by the valley 60 and the confronting webs 62 connected thereto. At least one and preferably a pair of opposed access openings 70, 72 are provided in the confronting webs 62 to establish communication between the cells 66, 68 and the trough 64.

Embossments 74 are provided in the web 62 at opposite ends of the access opening 70. The embossments 74 (FIGS. 3 and 5) are slit during the embossing operation so as to provide aligned apertures 75, 76. During installation, the tab 27, for example, is inserted into the aperture 75. Thereafter the sidewall 16 is moved toward the sidewall 15 to allow the tab 28 to be inserted into the aperture 76. When installed, the rear edges 20 of the sidewalls 15, 16 are adjacent the web 62.

Once installed, the isolator device 12 provides a generally vertical chamber 78 (FIGS. 4 and 6) defined, at least in part, by the opposite sidewalls 15, 16, the connecting wall 26, and those portions of the valley 60 and web 62 which are enclosed by the isolator device 12. The access opening 70 is included within the vertical chamber 78 and establishes communication between the cell 66 and the interior of the chamber 78.

As best shown in FIG. 6, the partition plate 14 with a duplex receptacle 80 attached thereto is installed by inserting the lower portion 42 thereof between the front wall 26 and the abutments 40. The upper portion 44—extending upwardly beyond the upper edges 24 of the sidewalls 15, 16 and the crest 58—is positively secured by the fastener 47 to a housing 82 which spans across the adjacent crest 58.

The insert 10 may be used in combination with capping means 84 (FIG. 4) which encloses the intermediate trough 64 to provide an intermediate or third raceway or cell 86. The capping means 84 may comprise spaced-apart cover strips 88 which span across the intermediate trough 64. Each pair of adjacent cover strips 88 present confronting edges 89 which are spaced-apart by the housing 82 to allow access to a trough portion 90 within which reside the insert 10 and the opposed access openings 70, 72.

FIG. 6 illustrates a floor structure 92 wherein a layer of concrete 94 covers the distribution unit 56. The layer of concrete 94 includes a concrete cover 96 overlying the adjacent crests 58 and the cover strip 88 and has a thickness indicated at 98. The concrete cover thickness 98 may vary from about one inch (2.54 cm) to 3¼ inches (8.26 cm) or more. Where the concrete cover thickness 98 exceeds two inches (5.08 cm), the housing 82 with a protective cover (not illustrated) attached thereto is installed over the distribution unit 56 prior to pouring the concrete 94. Once the concrete 94 has hardened and access to the housing 82 is desired, a portion of the concrete cover directly above the outlet opening 100 of the housing 82 is removed. A passageway 102 is formed in the concrete 94 which has an upper end 104 communicating with the space above the concrete 94 and has a lower end 106 communicating through the confronting edges 89 (only one visible in FIG. 6) of the cover strips 88 with the trough portion 90. Thereafter, the insert 10 is installed and cover means schematically illustrated at 108 is installed in covering relation with the upper end 104 of the passageway 102.

As indicated above, the housing 82 is available in depths indicated at 110 of 1½ inch (3.81 cm), 1⅝ inch (4.13 cm) and 2⅜ inches (6.03 cm) to accommodate anticipated concrete cover thicknesses of two inches (5.04 cm), 2½ inches (6.35 cm) and three inches (7.62 cm) or 3¼ inches (8.26 cm), respectively. By utilizing the isolator device 12 of this invention, one of the existing partition plates, such as the plate 14, may be used which has a height adapted to accommodate one of the above-identified concrete cover thicknesses 98. Therefore the stocking and provision of partition extensions of heights different from existing partition plates is entirely eliminated.

It should be observed in FIG. 6 that the front wall 26 and the abutments 40 are vertically offset from one another. In the preferred arrangement, the abutments 40 are positioned above the front wall 26. Therefore when the upper end 44 of the partition 14 is secured to the housing 82 by means of the fastener 47, the partition plate is rotated in a clockwise direction about the abutments 40. The arrangement is such that the isolator device 12 is urged laterally away from the web 62 thereby urging the tabs 27, 28 into firm engagement with the embossments 74. The arrangement also results in electrical ground continuity between the housing 82, the receptacle 80, the partition plate 14, the insert device 12 and the distribution unit 56.

I claim:

1. An insert for use in an electrical wiring distributing system, said insert including an isolator device having a generally U-shaped configuration including
    spaced-apart sidewalls having corresponding forward edges, rear edges, lower edges and upper edges;
    a connecting front wall extending between said forward edges;
    tabs, one on each of said rear edges, said tabs extending in opposite directions from and generally normal to said sidewalls;
    abutments, one on each of said sidewalls and spaced from said front wall; and
    a partition plate having a portion captively retained between said front wall and said abutments, and a portion extending upwardly beyond said upper edges.

2. The insert of claim 1 including means connecting said partition plate to said isolator device in electrically grounded relation therewith.

3. The insert of claim 1 or 2 wherein said front wall comprises a narrow strip having a height which is a minor fraction of the height of said sidewalls.

4. The insert of claim 3 wherein said narrow strip is vertically offset from said abutments.

5. The insert of claim 3 including
    a stiffening rib formed in and longitudinally of said narrow strip.

6. An electrical wiring distributing floor structure comprising:
    a distribution unit presenting spaced generally parallel raceways and an intermediate lengthwise trough defined by a valley and confronting webs connected to said valley, and spaced capping means enclosing said trough to provide an intermediate raceway and access to a trough portion;
    a covering layer of concrete;
    a passageway in said concrete having an upper end communicating with the space above said concrete and a lower end communicating through said spaced capping means with said trough portion;
    opposed access openings in said confronting webs within said trough portion;
    embossments in one web at opposite ends of one access opening, said embossments being slit and providing aligned apertures;
    a generally U-shaped isolator device disposed within said trough portion and cooperating with said valley and said one web to provide a generally vertical chamber including said one access opening, and tabs extending from said device into said aligned apertures thereby positively connecting said isolator device to said distribution unit; said isolator device comprising spaced sidewalls having forward edges remote from said one web, a connecting front wall extending between said forward edges, abutments, one on each of said sidewalls spaced from said front wall, and a partition plate having a portion captively retained between said front wall and said abutments, and a portion extending upwardly into said passageway; and
    cover means supported in covering relation with said upper end of said passageway.

7. The floor structure of claim 6 wherein said front wall comprises a narrow strip having a height which is a minor fraction of the height of said sidewalls.

8. The floor structure of claim 7 wherein said narrow strip is vertically offset from said embossments.

9. A distribution unit for use in a floor structure to provide parallel raceways, including:
    a metal cellular unit presenting alternating crests and valleys connected by webs, said unit presenting a lengthwise trough intermediate of adjacent raceways and defined by a valley and confronting webs;
    opposed access openings in said confronting webs;
    a generally U-shaped isolator device disposed within said trough and cooperating with said valley and one web to provide a generally vertical chamber including one of said access openings, said device presenting oppositely extending tabs adjacent to said one web; said isolator device comprising spaced sidewalls and a connecting front wall remote from said one web, and including abutments on said sidewalls spaced said front wall, and a partition plate having a portion captively retained between said front wall and said abutments, and a portion extending upwardly beyond said sidewalls and said one web; and embossments in said one web at opposite ends of said one of said access openings, said embossments being slit and providing aligned apertures;

each of said tabs extending into one of said apertures thereby positively connecting said isolator device to said metal cellular unit.

10. The distribution unit of claim 9 including means connecting said partition plate to said isolator device in electrically grounded relation therewith.

11. The distribution unit of claim 9 or 10 wherein said front wall comprises a narrow strip having a height which is a minor fraction of the height of said sidewalls.

12. The distribution unit of claim 11 wherein said narrow strip is vertically offset from said embossments.

13. An electrical wiring distributing floor structure comprising:

a distribution unit presenting spaced generally parallel raceways and an intermediate lengthwise trough defined by a valley and confronting webs connected to said valley, and spaced capping means enclosing said trough to provide an intermediate raceway and access to a trough portion;

a covering layer of concrete;

a passageway in said concrete having an upper end communicating with the space above said concrete and a lower end communicating through said spaced capping means with said trough portion;

opposed access openings in said confronting webs within said trough portion;

embossments in one web at opposite ends of one access opening, said embossments being slit and providing aligned apertures;

a generally U-shaped isolator device disposed within said trough portion and cooperating with said valley and said one web to provide a generally vertical chamber including said one access opening, and tabs extending from said device into said aligned apertures thereby positively connecting said isolator device to said distribution unit, said isolator device comprising spaced sidewalls having forward edges remote from said one web, a connecting front wall extending between said forward edges, said front wall comprising a narrow strip having a height which is a minor fraction of the height of said sidewalls; and cover means supported in covering relation with said upper end of said passageway.

14. The floor structure of claim 13 wherein said narrow strip is vertically offset from said embossments.

* * * * *